(12) United States Patent
Mino et al.

(10) Patent No.: US 8,169,739 B2
(45) Date of Patent: May 1, 2012

(54) PERPENDICULAR MAGNETIC WRITE HEAD

(75) Inventors: Tetsuya Mino, Hong Kong (CN); Naoto Matono, Hong Kong (CN); Ikuhito Onodera, Hong Kong (CN); Kazushi Nishiyama, Hong Kong (CN); Michitoshi Tsuchiya, Hong Kong (CN); Kenji Sasaki, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 295 days.

(21) Appl. No.: 12/585,456

(22) Filed: Sep. 15, 2009

(65) Prior Publication Data
US 2011/0063754 A1    Mar. 17, 2011

(51) Int. Cl.
*G11B 5/31*        (2006.01)
(52) U.S. Cl. .................................... 360/125.06
(58) Field of Classification Search .................. None
See application file for complete search history.

(56) References Cited

U.S. PATENT DOCUMENTS

| | | | | |
|---|---|---|---|---|
| 5,668,686 | A * | 9/1997 | Shouji et al. | 360/319 |
| 5,880,910 | A * | 3/1999 | Shouji et al. | 360/327.31 |
| 7,518,824 | B2 * | 4/2009 | Sasaki et al. | 360/125.09 |
| 7,870,660 | B2 * | 1/2011 | Sasaki et al. | 29/603.16 |
| 2004/0061973 | A1 | 4/2004 | Crue et al. | |
| 2006/0028763 | A1 * | 2/2006 | Matono | 360/126 |
| 2006/0198049 | A1 * | 9/2006 | Sasaki et al. | 360/126 |
| 2007/0223141 | A1 * | 9/2007 | Gomi et al. | 360/126 |
| 2008/0068747 | A1 * | 3/2008 | Sasaki et al. | 360/110 |
| 2009/0273863 | A1 * | 11/2009 | Kawano et al. | 360/319 |
| 2011/0051293 | A1 * | 3/2011 | Bai et al. | 360/313 |

FOREIGN PATENT DOCUMENTS

JP        2006-139848        6/2006

* cited by examiner

*Primary Examiner* — Mark Blouin
(74) *Attorney, Agent, or Firm* — Nixon & Vanderhye P.C.

(57) ABSTRACT

A perpendicular magnetic write head in which unintended erasure of information at the time of non-writing can be suppressed while keeping the capability of writing is provided. The perpendicular magnetic write head includes a magnetic pole tip portion, a first yoke portion connected to the magnetic pole tip portion, having a width larger than that of the magnetic pole tip portion, and having a recess portion in a center region thereof, and a second yoke portion embedded in the recess portion. The magnetic pole tip portion and the first yoke portion are integrally formed with a vapor deposition method, and the second yoke portion is formed with a plating method. Since the saturation flux density of the magnetic pole tip portion formed with the vapor deposition method becomes higher than that of the yoke portion, a magnetic flux intake capacity of the magnetic pole tip portion is ensured. In a magnetic domain structure of the yoke portion most of which is formed with the plating method, since an easy magnetization axis becomes likely to be directed in a direction perpendicular to an emitting direction of a magnetic flux, residual flux becomes less likely to leak out of the main magnetic pole layer at the time of non-writing.

3 Claims, 10 Drawing Sheets

PERPENDICULAR MAGNETIC WRITE HEAD

BACKGROUND OF THE INVENTION

1. Field of the Invention

The present invention relates to a perpendicular magnetic write head provided with a magnetic pole layer that includes a magnetic pole tip portion of a narrow width defining a width of a write track and a yoke portion of a large width connected thereto.

2. Description of the Related Art

In recent years, performance improvement of a magnetic write head is required because of the increasing surface writing density of a magnetic recording medium such as a hard disk (hereinafter referred to as "recording medium"). Accordingly, a magnetic write head of a perpendicular magnetic write type (perpendicular magnetic write head) in which a signal magnetic field is set in a direction perpendicular to a recording surface of the recording medium attracts attention. This is because of advantages that a linear recording density becomes high and that the recorded recording medium is less affected by the influence of heat fluctuation.

The perpendicular magnetic write head is provided with a thin film coil for generating a magnetic flux, and a main pole layer which leads the magnetic flux generated in the thin film coil to the recording medium. This magnetic pole layer includes a tip portion (magnetic pole tip portion) of a narrow width that defines a width of a write track, and a rear portion (yoke portion) of a large width connected thereto.

Various studies have been conducted on configuration of the perpendicular magnetic write head to cope with further increasing recording density. Specifically, the magnetic pole tip portion is formed to include a high saturation flux density portion having a recess portion in the center thereof in a write track width direction, and a low saturation flux density portion embedded in the recess portion (Japanese Patent Application Publication No. 2006-139848). Besides, the magnetic pole layer is formed to include a lower layer having a high saturation flux density and an upper layer having a low saturation flux density (US Patent Application Publication No. 2004/0061973).

SUMMARY OF THE INVENTION

These days, since the surface recording density is still more increasing and a further narrowing of a width of a write track is thereby developing yet, the width (width of a trailing edge, which is a portion substantially in charge of the writing) of a magnetic pole tip portion becomes extremely narrow. As a result, the volume (magnetic flux intake capacity) of the magnetic pole tip portion is decreasing, and thus the recording (writing) capability tends to be insufficient.

Moreover, residual flux becomes likely to leak out of the magnetic pole layer due to the magnetic domain structure of the yoke portion, which occupies a most port of the magnetic pole layer. As a result, unintended erasure of information written on the recording medium may occur at the time of non-writing.

Therefore, it is desired to provide a perpendicular magnetic write head capable of suppressing unintended erasure of information at the time of non-writing while keeping the capability of writing.

A perpendicular magnetic write head according to an embodiment of the present invention includes: a magnetic pole tip portion; a first yoke portion connected to the magnetic pole tip portion, having a width larger than that of the magnetic pole tip portion, and having a recess portion in a center region thereof; and a second yoke portion embedded in the recess portion, the magnetic pole tip portion and the first yoke portion being integrally formed with a vapor deposition method, and the second yoke portion being formed with a plating method.

In other words, the perpendicular magnetic write head described above is provided with a magnetic pole layer including the magnetic pole tip portion and the yoke portion, the magnetic pole tip portion leading a magnetic flux generated in a thin film coil to a recording medium and defining a width of a write track, the yoke portion being connected to the magnetic pole tip portion and having a width larger than that of the magnetic pole tip portion. The magnetic pole layer includes an outer frame portion and an embedded portion, the outer frame portion being formed with the vapor deposition method and being integrally configured of the magnetic pole tip portion and a part of the yoke portion having the recessed configuration in the center region thereof on a trailing side, the embedded portion being formed with the plating method and being configured of a remaining portion of the yoke portion embedded in the recess portion.

According to the perpendicular magnetic write head, since the magnetic pole tip portion and the first yoke portion are integrally formed with the vapor deposition method and the second yoke portion is formed with the plating method, the magnetic flux intake capacity of the magnetic pole tip portion is ensured, and residual flux becomes less likely to leak out of the magnetic pole tip portion at the time of writing. Therefore, unintended erasure of information at the time of non-writing can be suppressed while keeping the capability of writing.

DETAILED DESCRIPTION OF THE PREFERRED EMBODIMENTS

An embodiment of the invention will be described in detail hereinbelow with reference to the drawings.

Figure 1A:
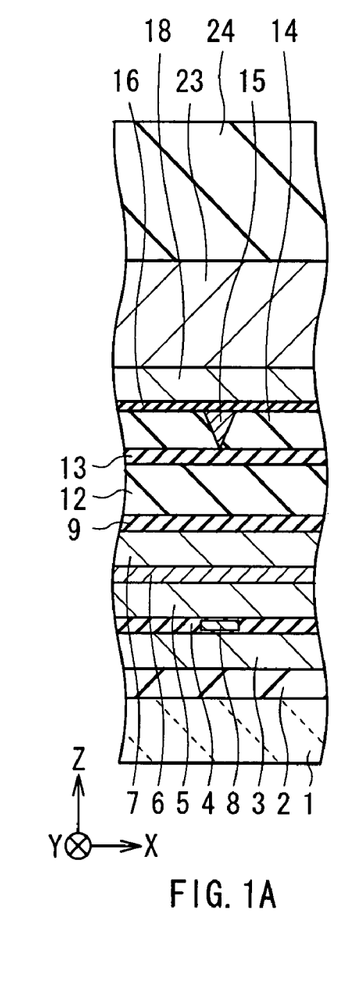
FIG. 1A and FIG. 1B are sectional views showing a configuration of a thin film magnetic head provided with a perpendicular magnetic write head according to an embodiment of the present invention.
Figure 1B:
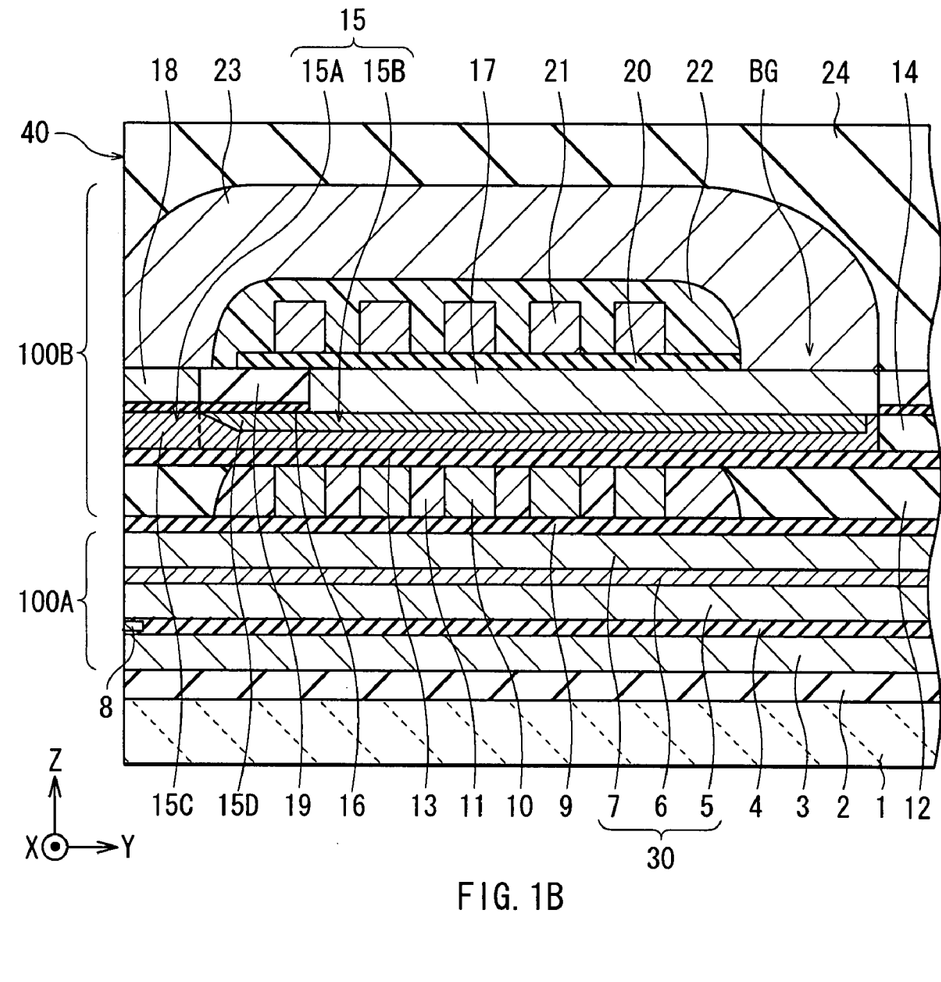

First, explanation will be made on a configuration of a thin film magnetic head provided with a perpendicular magnetic write head according to an embodiment of the present invention. FIG. 1A and FIG. 1B show a cross-sectional configuration of the thin film magnetic head respectively parallel to and perpendicular to an air bearing surface 40.

In the following description, dimensions in X-axis, Y-axis, and Z-axis directions represented in FIG. 1A and FIG. 1B are defined as "width", "length" and "thickness" respectively. In addition, a side closer to the air bearing surface 40 in the Y-axis direction is defined as a "front side" and a side far therefrom is defined as a "rear side". Further, if a state of a recording medium (not shown) which makes a relative movement with respect to the thin film magnetic head is regarded as a stream, a side ahead of (upper side of) the stream is defined as a "trailing side" and a side behind (lower side of) the stream is defined as a "leading side". These definitions are also applicable to FIG. 2 and after, which will be hereinafter described.

The thin film magnetic head to be described here is a device that applies a magnetic processing to the recording medium such as a hard disk, and is, for example, a combined head that can execute both of write and read processings.

In the thin film magnetic head, an insulating layer 2, a read head section 100A executing the read processing by means of MR effect (MR: magneto-resistive effect), a separating layer 9, a write head section 100B executing the write processing of a perpendicular magnetic write type, and an overcoat layer 24 are stacked in this order on a substrate 1, for example.

The substrate 1 is made of a ceramic material such as AlTic ($Al_2O_3 \cdot TiC$), for example. The insulating layer 2, the separating layer 9, and the overcoat layer 24 are made of a non-magnetic insulation material such as aluminium oxide ($Al_2O_3$; hereinafter referred to as "alumina"), for example.

In the read head section 100A, a lower read shield layer 3, a shield gap layer 4, and an upper read shield layer 30 are stacked in this order. A read element (MR element 8) is embedded in the shield gap layer 4 with one end thereof exposed on the air bearing surface 40.

The lower read shield layer 3 is made of a magnetic material such as nickel iron alloy (NiFe), for example. Examples of the nickel iron alloy include Permalloy (trade name) etc., which contains a nickel content of eighty weight percent and an iron content of twenty weight percent. In the upper read shield layer 30, upper read shield layer portions 5 and 7 are stacked, with a nonmagnetic layer 6 in between. The upper read shield layer portions 5 and 7 are configured of a magnetic material such as a Permalloy, for example, and the nonmagnetic layer 6 is configured of a nonmagnetic conductive material such as ruthenium (Ru) or a nonmagnetic insulation material such as alumina, for example.

The shield gap layer 4 is configured of a non-magnetic insulation material such as alumina, for example. The MR element 8 operates by utilizing giant magneto-resistive effect (GMR: giant magneto-resistive effect) or tunneling magneto-resistive effect (TMR: tunneling magneto-resistive effect), etc., for example.

In the write head section 100B, a first thin film coil 10 embedded in insulating layers 11 to 13, a main magnetic pole layer 15 of which periphery is embedded with a non-magnetic layer 14, a gap layer 16, an auxiliary magnetic pole layer 17, a write shield layer 18, an insulating layer 19, a second thin film coil 21 embedded in insulating layers 20 and 22, and a return yoke layer 23 are stacked in this order.

The thin film coil 10 is configured of a high conductivity metal material such as copper (Cu) for example, and has a structure (spiral structure) in which the thin film coil 10 is wound around a back gap BG.

The insulating layer 11 is configured of a non-magnetic insulation material such as photoresist or spin on glass (SOG: Spin On Glass) exhibiting fluidity at the time of heating, for example, and the insulating layers 12 to 14 are made of a non-magnetic insulation material such as alumina, for example.

The main pole layer 15 functions to lead a magnetic flux generated mainly in the thin film coil 21 to the recording medium, and extending backward from the air bearing surface 40. The main magnetic pole layer 15 is configured of a magnetic material having high saturation flux densities, such as an iron-based alloy, for example. Examples of the iron-based alloy include an iron cobalt alloy (FeCo), an iron cobalt nickel alloy (FeCoNi), or the like.

Also, the main magnetic pole layer 15 includes a magnetic pole tip portion 15A and a yoke portion 15B in order from the air bearing surface 40. The magnetic tip portion 15A is a portion substantially generating a perpendicular magnetic field, and has a width that defines the width of a write track. The yoke portion 15B is connected to the magnetic pole tip portion 15A, and has a width larger than that of the magnetic pole tip portion. The detailed configuration of the main magnetic pole layer 15 is mentioned later (see FIG. 2).

The gap layer 16 is what is called a write gap, and is configured of a nonmagnetic insulation material such as alumina, for example.

The auxiliary magnetic pole layer 17 is configured of a magnetic material similar to that of the main magnetic pole layer 15, for example. This auxiliary magnetic pole layer 17 extends backward from a position recessed from the air bearing surface 40 on the trailing side of the main magnetic pole layer 15, and is connected to the main magnetic pole layer 15.

The write shield layer 18 extends backward from the air bearing surface 40 on the trailing side of the main magnetic pole layer 15 while neighboring the gap layer 16, and is configured of a magnetic material similar to that of the main magnetic pole layer 15, for example.

The insulating layer 19 is provided between the auxiliary magnetic pole layer 17 and the write shield layer 18, and is configured of a non-magnetic insulation material such as alumina, for example.

The material and configuration, etc., of the thin film coil 21 are similar to those of the thin film coil 10, for example.

The insulating layer 20 is configured of a non-magnetic insulation material similar to that of the insulating layers 12 and 13 for example, and the insulating layer 22 is configured of a non-magnetic insulation material similar to that of the insulating layer 11, for example. The insulating layers 20 and 22 are connected to the insulating layer 19, and the forefront edges of the insulating layers 20 and 22 are recessed from the forefront edge of the insulating layer 19, for example.

The return yoke layer 23 extends backward from the air bearing surface 40 on the trailing side of the auxiliary magnetic pole layer 17 and the write shield layer 18, and is connected to the write shield layer 18 at the front portion thereof while connected to the auxiliary magnetic pole layer 17 on the back-gap BG at the rear portion thereof. The return yoke layer 23 is configured of a magnetic material similar to that of the main magnetic pole layer 15, for example.

Figure 2:
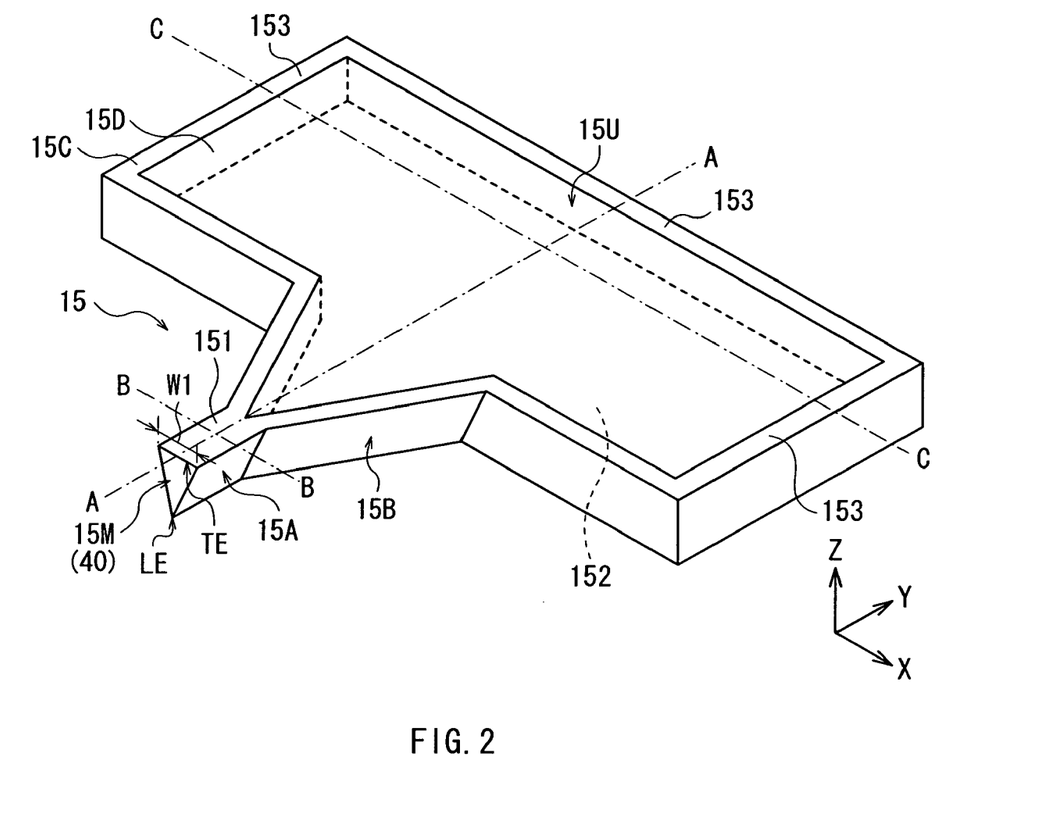
FIG. 2 is an enlarged perspective view showing a configuration of a main magnetic pole layer illustrated in FIG. 1.
Figure 3A:
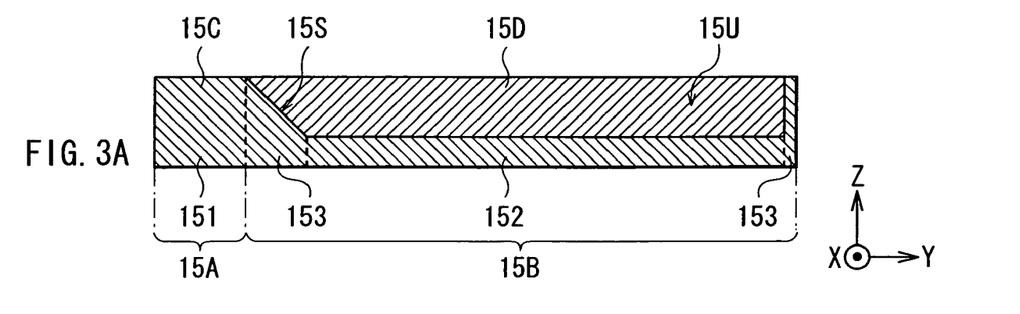
FIG. 3A, FIG. 3B and FIG. 3C are sectional views taken along the lines A-A, B-B and C-C of the main magnetic pole layer respectively illustrated in FIG. 2.
Figure 3B:
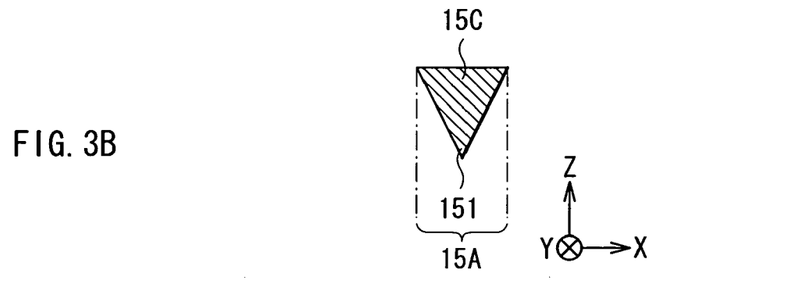
Figure 3C:
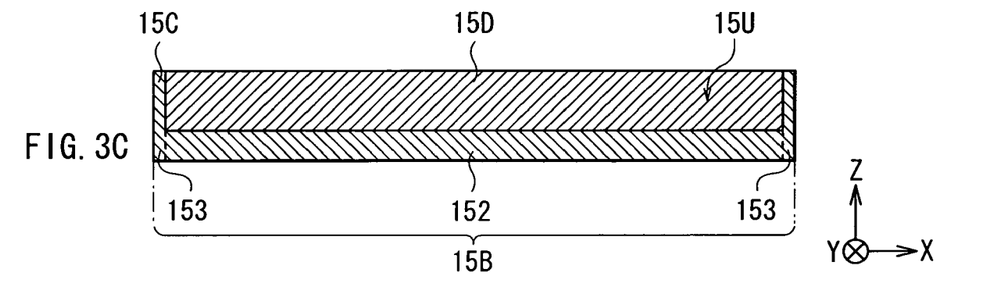

Subsequently, the detailed configuration of the main magnetic pole layer 15 will be explained. FIG. 2 is an enlarged view showing a perspective configuration of the main magnetic pole layer 15, and FIG. 3A, FIG. 3B and FIG. 3C show a cross-sectional configuration taken along the lines A-A, B-B and C-C illustrated in FIG. 2, respectively.

The main magnetic pole layer 15 includes two portions (an outer frame portion 15C and an embedded portion 15D), which are formed in separate processes. The outer frame portion 15C includes the magnetic pole tip portion 15A (a magnetic pole tip portion relevance portion 151) and a part of (a bottom face portion 152 and a side face portion 153) the yoke portion 15B having a recessed configuration in which a recess portion 15U is provided in the center region thereof on the trailing side, both of which are integrally formed (integrated). The embedded portion 15D is the remaining part of the yoke portion 15B, which is embedded in the recess portion 15U. In FIG. 3A and FIG. 3C, boundaries between the magnetic pole tip portion relevance portion 151, the bottom face portion 152, and the side face portion 153 are denoted by broken line so as to distinguish the occupancy ranges thereof.

The embedded portion 15D is formed with a plating method, and the outer frame portion 15C is formed with a vapor deposition method. The vapor deposition method means a sputtering method, an evaporation method, a chemical vapor deposition (CVD: chemical vapor deposition) method, or an atomic layer deposition (ALD: atomic layer deposition) method, for example. The plating method means an electroplating method, an electroless plating method, or the like, for example. Here, since incorporation of impurities is likely to occur at the time of deposition (at the time of growth of a plating film) if the plating method is used as a way of depositing a magnetic material, the saturation flux density tends to decrease. On the other hand, when the vapor deposition method is used, incorporation of impurities is less likely to occur at the time of deposition, and thus the saturation flux density tends to increase. Accordingly, the saturation flux density of the outer frame portion 15C formed with the vapor deposition method becomes higher than the saturation flux density of the embedded portion 15D formed with the plating method.

Thus, since the saturation flux density differs between the outer frame portion 15C and the embedded portion 15D because of the difference in their formation method (vapor deposition method or plating method), the formation materials thereof may be either the same or different. In this case, in order to make a difference in the saturation flux density between the outer frame portion 15C and the embedded portion 15D while keeping it sufficiently high, it is preferred that the outer frame portion 15C be formed of an iron cobalt alloy (saturation flux density=2.4 T (tesla)) and the embedded portion 15D be formed of an iron cobalt nickel alloy (saturation flux density=2.3 T), for example.

In other words, the perpendicular magnetic write head is provided with the magnetic pole tip portion 15A, a first yoke portion (a part of the outer frame portion 15C excluding the magnetic pole tip portion 15A) connected to the magnetic pole tip portion 15A, having a width larger than that of the magnetic pole tip portion, and having the recess portion 15U in the center region thereof, and a second yoke portion (embedded portion 15D) embedded into the recess portion 15U. Further, the magnetic pole tip portion 15A and the first yoke portion are integrally formed with the vapor deposition method, and the second yoke portion is formed with the plating method.

The main magnetic pole layer 15 has an end face 15M in the air bearing surface 40. The shape of the end face 15M is a triangle (inverse triangle) in which the width W1 of the end edge on the trailing side (trailing edge TE) is larger than the width of the end edge on the leading side (leading edge LE), for example. The shape of the end face 15M may be either right-left symmetrical or unsymmetrical.

The width of the yoke portion 15B may be either uniform or varied if only it is larger than the width (width W1 of the trailing edge TE) of the magnetic pole tip portion 15A. For example, the width of a front part of the yoke portion 15B spreads gradually from the connecting position of the magnetic pole tip portion 15A and the yoke portion 15B, and the width of a rear part thereof is larger than the maximum width of the front part and is uniform. Thereby, the yoke portion 15B is a horizontally-long planar configuration (larger in the X axial direction) as a whole. In this case, an inclined surface 15S is formed in the outer frame portion 15C in the vicinity of the connecting position between the magnetic pole tip portion 15A and the yoke portion 15B.

The thin film magnetic head is operated as follows.

Upon writing information, when electric current flows into the thin film coil 21 of the write head section 100B and a writing magnetic flux is generated, the magnetic flux flows through the inside of the main magnetic pole layer 15 toward the magnetic tip portion 15A, and gathers in the vicinity of the trailing edge TE. When this magnetic flux is emitted outside to generate a perpendicular magnetic field, information is thus magnetically written on the recording medium with the perpendicular magnetic field.

In this case, a magnetic flux for leakage prevention is generated in the thin film coil 10 so that the writing magnetic flux is less likely to flow out into the read head section 100A. Thereby, the deterioration of detecting accuracy in the MR element 8 is suppressed, and unintended erasure of the information caused by unnecessary magnetic field generated in the lower read shield layer 3 and the upper read shield layer 30 is also suppressed. In addition, since the magnetic flux generated from the magnetic tip portion 15A is partially (spread components) taken into the write shield layer 18, diffusion of the perpendicular magnetic field is suppressed and the gradient increases. The magnetic flux taken into the write shield layer 18 is supplied again to the main magnetic pole layer 15 via the return yoke layer 23.

The magnetic flux emitted from the main magnetic pole layer 15 returns to the return yoke layer 23 via the recording medium and is supplied again to the main magnetic pole layer 15. In this manner, the magnetic flux circulates between the write head section 100B and the recording medium, thereby establishing a magnetic circuit.

On the other hand, when sense current flows into the MR element 8 of the read head section 100A at the time of reading information, the resistance of the MR element 8 changes in accordance with a read signal magnetic field of the recording medium. Since such resistance change is detected as a voltage change, information written on the recording medium is magnetically read out.

Figure 4A:
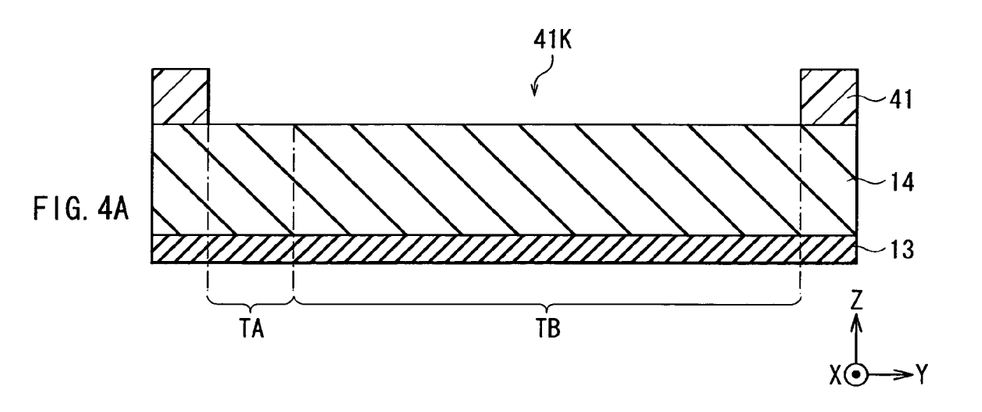
FIG. 4A, FIG. 4B and FIG. 4C are sectional views to explain a process of manufacturing the principal portion of the thin film magnetic head.
Figure 4B:
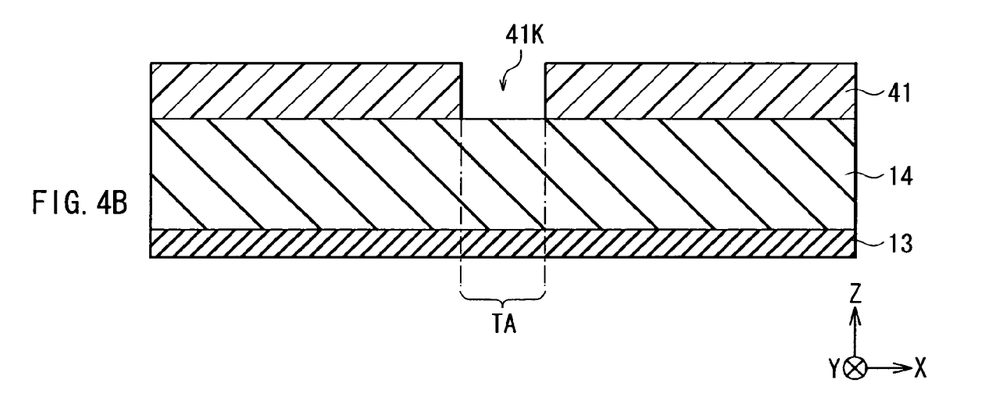
Figure 4C:
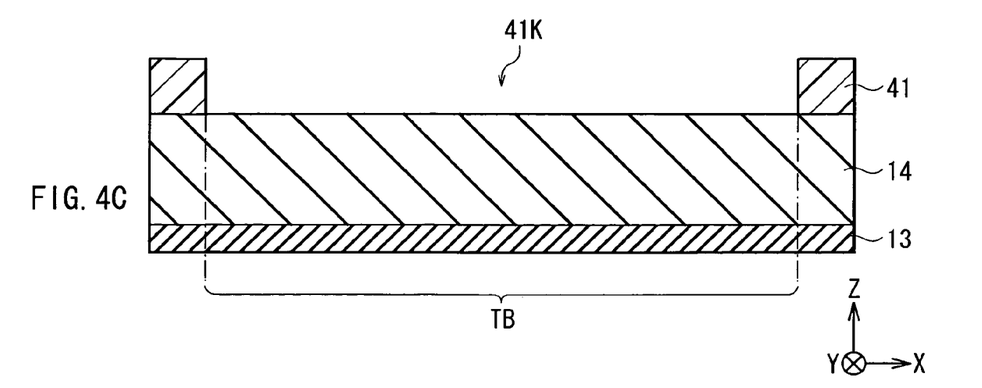

Next, a method of manufacturing the thin film magnetic head will be explained. Here, since the detailed description has been already made on materials, dimensions, configurations, etc., of the series of component elements, description thereof will be omitted as needed. FIG. 4A, FIG. 4B and FIG. 4C to FIG. 8A, FIG. 8B and FIG. 8C explain the formation process of the main magnetic pole layer 15, which is the principal portion of the thin film magnetic head. FIG. 4A, FIG. 4B and FIG. 4C illustrate a cross-sectional configuration corresponding to FIG. 3A, FIG. 3B and FIG. 3C respectively, and the same goes for FIG. 5A, FIG. 5B and FIG. 5C to FIG. 8A, FIG. 8B and FIG. 8C. Regions TA and TB are regions in which the magnetic pole tip portion 15A and the yoke portion 15B are formed respectively, and having a configuration corresponding to the planar configuration of the main magnetic pole layer 15 as a whole.

The thin film magnetic head is manufactured by sequentially forming and stacking the series of component elements, mainly by means of existing thin film process. The existing thin film process means, for example, a film formation technique such as a vapor deposition method and a plating method, a patterning technique such as a photolithography method, an etching technique such as a dry etching process and a wet etching process, and a polishing technique such as a chemical mechanical polishing (CMP: chemical mechanical polishing), etc. However, technique other than the above may be also used.

Upon forming the main magnetic pole layer 15, an insulating layer 14 is first formed to cover the surface plane of the insulating layer 13 by a sputtering method etc., as illustrated in FIG. 4A, FIG. 4B and FIG. 4C, and thereafter, a photoresist pattern 41 having an opening portion 41K is formed on the insulating layer 14. In forming the photoresist pattern 41, after applying a photoresist to the surface of the insulating layer 14 to form a photoresist film, the photoresist film is patterned (developed and exposed) using a photolithography method, for example.

Figure 5A:
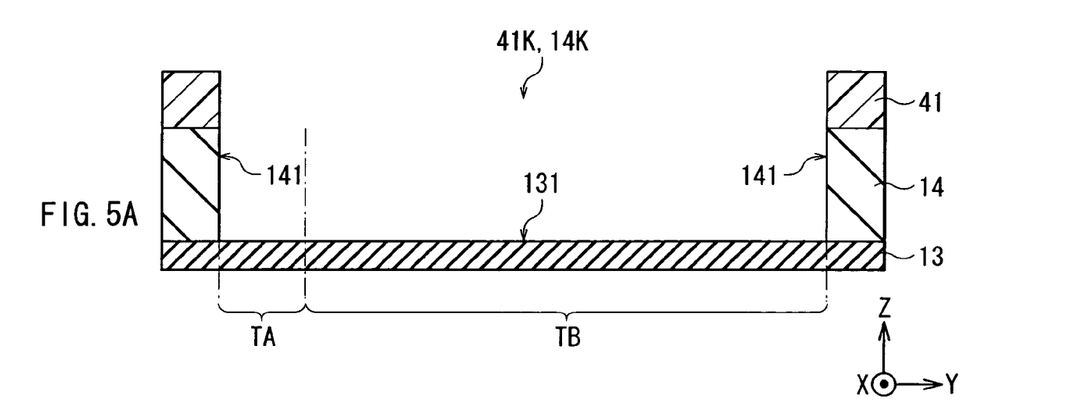
FIG. 5A, FIG. 5B and FIG. 5C are sectional views for explaining a step subsequent to that of FIG. 4A, FIG. 4B and FIG. 4C.
Figure 5B:
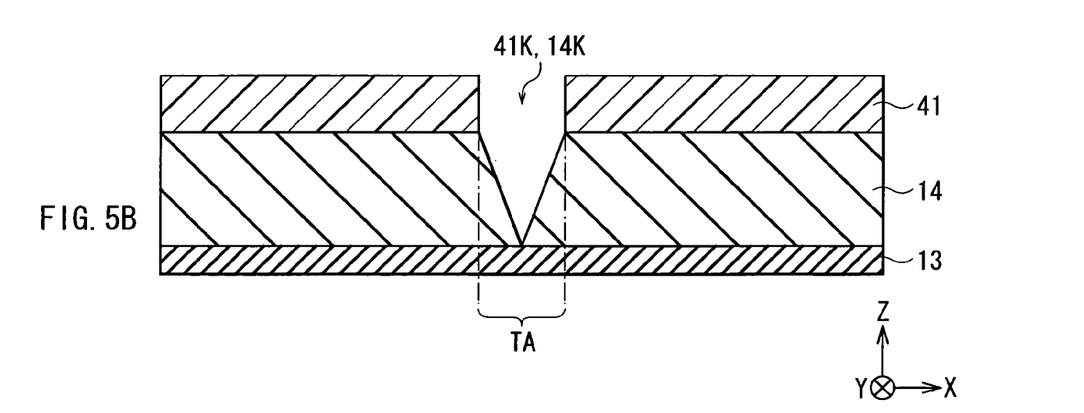
Figure 5C:
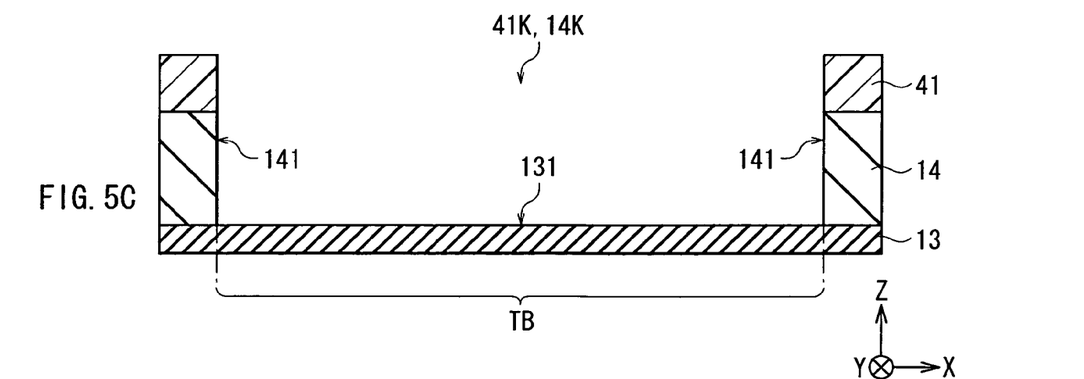

Subsequently, the insulating layer 14 is etched with a reactive ion etching method (RIE: reactive ion, etching) etc. with the photoresist pattern 41 as a mask, until the insulating layer 13 is exposed. Thereby, the opening portion 14K which includes the region TA of a narrow width and a small capacity and the region TB of a large width and a large capacity is formed as shown in FIG. 5A, FIG. 5B and FIG. 5C. In the etching process, since etched materials (shaved insulation layer 14) are deposited as the etching process proceeds in the region TA of small capacity, the width of the opening portion 14K decreases as approaching the insulating layer 13. Besides, any other etching methods such as an ion beam etching (IBE: ion beam etching) process may be used instead of the RIE method.

Figure 6A:
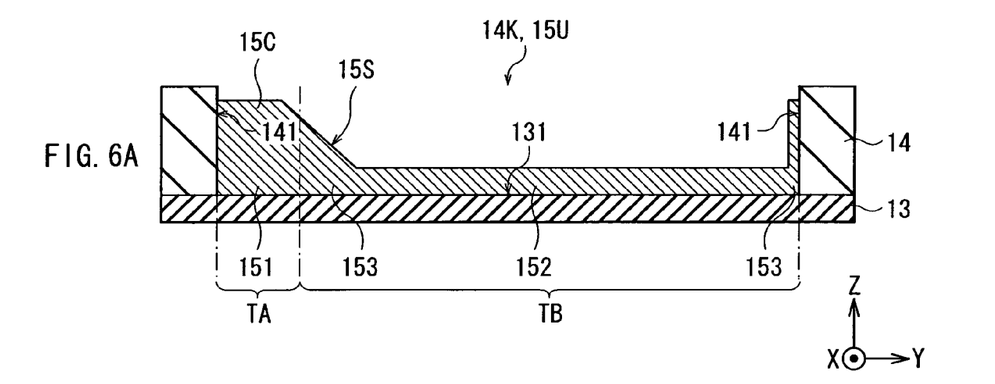
FIG. 6A, FIG. 6B and FIG. 6C are sectional views for explaining a step subsequent to that of FIG. 5A, FIG. 5B and FIG. 5C.
Figure 6B:
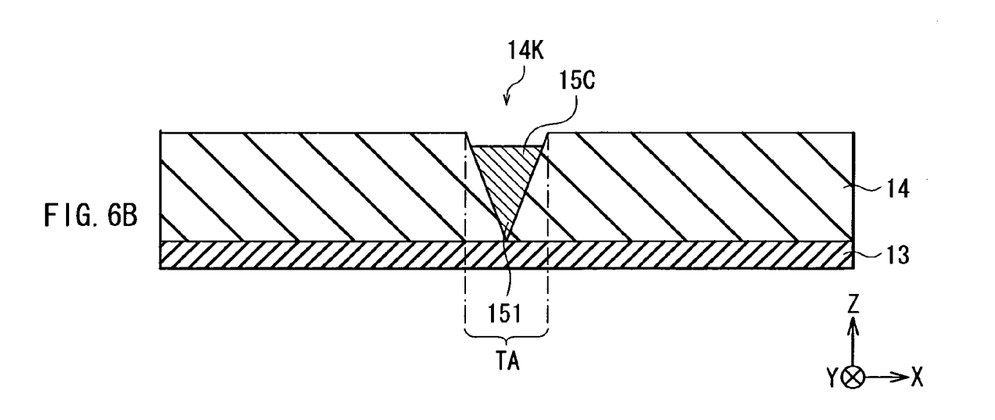
Figure 6C:
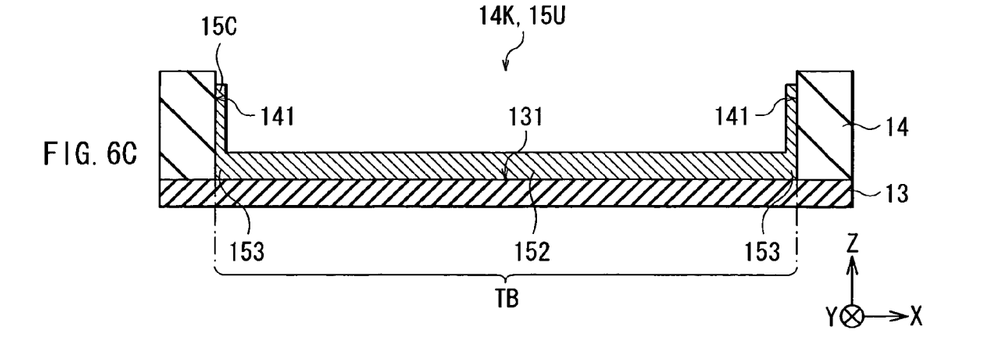

Subsequently, the outer frame portion 15C is formed as illustrated in FIG. 6A, FIG. 6B and FIG. 6C by depositing a magnetic material in the inside of the opening portion 14K using a vapor deposition method such as a sputtering method, with the insulating layer 14 having the opening portion 14K as a frame. In this case, the magnetic material is deposited until the region TA is filled in at least, and the magnetic material may be deposited excessively (until the thickness becomes larger than the minimum and indispensable level) as necessary so as to ensure that the region TA is filled in without fail.

In this depositing process, the deposition thickness of the magnetic material increases as the surface (exposed surface) 131 of the insulating layer 13 and an inner wall surface 141 of the insulating layer 14 are covered thereby. Further, even when the region TA of small capacity has been filled in with the magnetic material, the region TB of large capacity has not been filled in yet with the magnetic material because of the difference in capacity between the region TA and the region B. Thereby, the outer frame portion 15C is formed so as to include a portion occupying the whole of the region TA (the magnetic pole tip portion relevance portion 151) and a portion occupying a part of the region TB (the bottom face portion 152 and the side face 153) while the recess portion 15U, which is a space in which the magnetic material has not been deposited, is formed in the region TB.

In this case, since the region TB gradually spreads in width as going away from the region TA corresponding to the shape of the front part of the yoke portion 15B (see FIG. 2), the deposition thickness is varied (the deposition thickness becomes smaller as going back away from the boundary position) in the vicinity of the boundary position of the regions TA and TB when the magnetic material is deposited by vapor deposition method. Thereby, the inclined surface 15S is formed in the outer frame portion 15C in the vicinity of the boundary position.

Figure 7A:
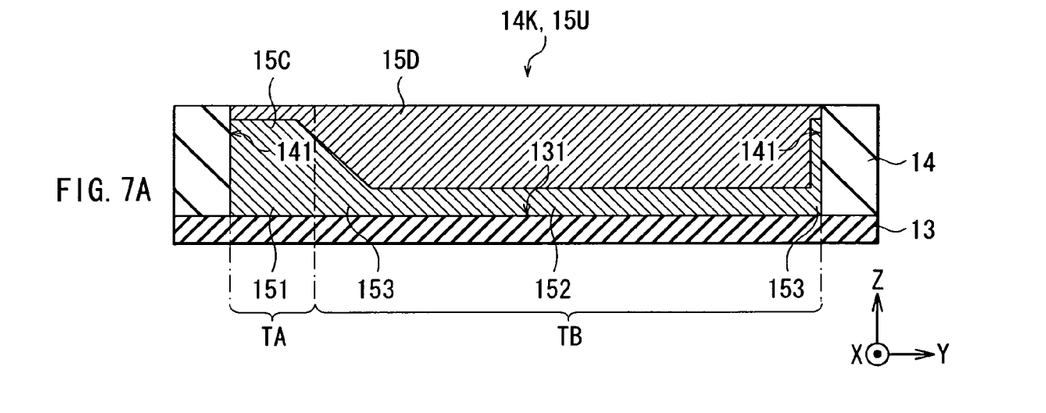
FIG. 7A, FIG. 7B and FIG. 7C are sectional views for explaining a step subsequent to that of FIG. 6A, FIG. 6B and FIG. 6C.
Figure 7B:
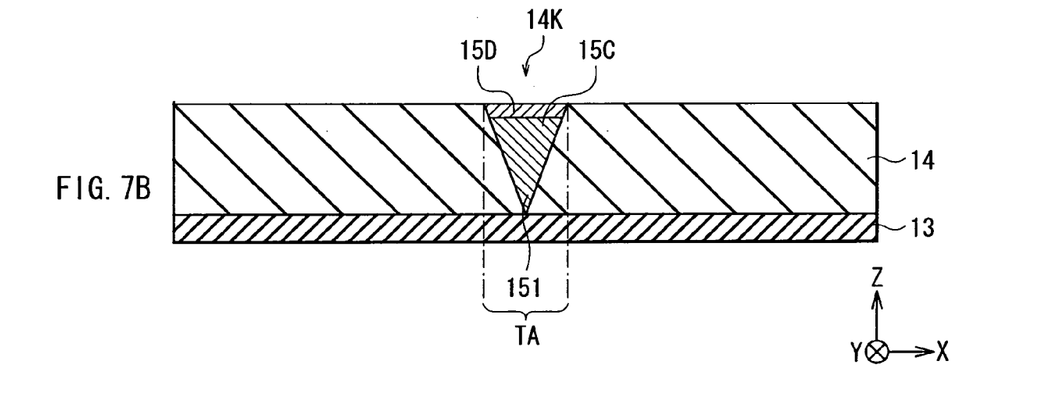
Figure 7C:
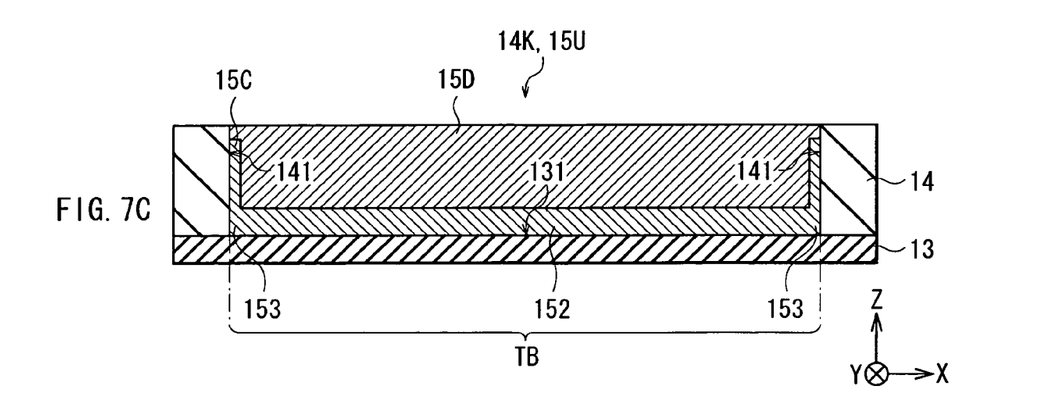

Subsequently, an embedded portion 15D is formed as illustrated in FIG. 7A, FIG. 7B and FIG. 7C by depositing a magnetic material on the inside of the opening portion 14K using a plating method such as an electroplating method, with the insulating layer 14 having the opening portion 14K as a frame. In this case, the magnetic material is deposited until the recess portion 15U is fully filled in at least, and the magnetic material may be deposited excessively (until the thickness becomes larger than the minimum and indispensable level) as necessary so as to ensure that the recess portion 15U may be filled in without fail. In addition, it is desirable to use the outer frame portion 15C, which has been already formed, as a seed layer for growing the plating film. It is because separate preparation of another seed layer becomes thereby unnecessary.

In this depositing process, since the plating film grows to fill in the recess portion 15U, the embedded portion 15D is formed in the recess portion 15U.

Figure 8A:
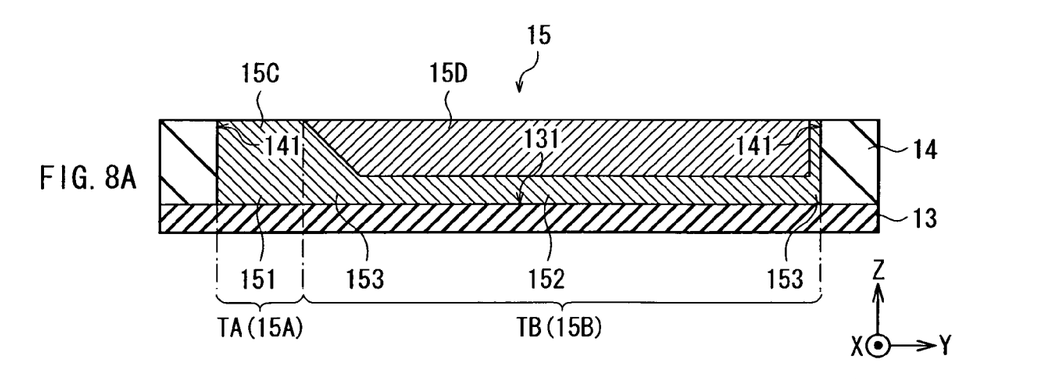
FIG. 8A, FIG. 8B and FIG. 8C are sectional views for explaining a step subsequent to that of FIG. 7A, FIG. 7B and FIG. 7C.
Figure 8B:
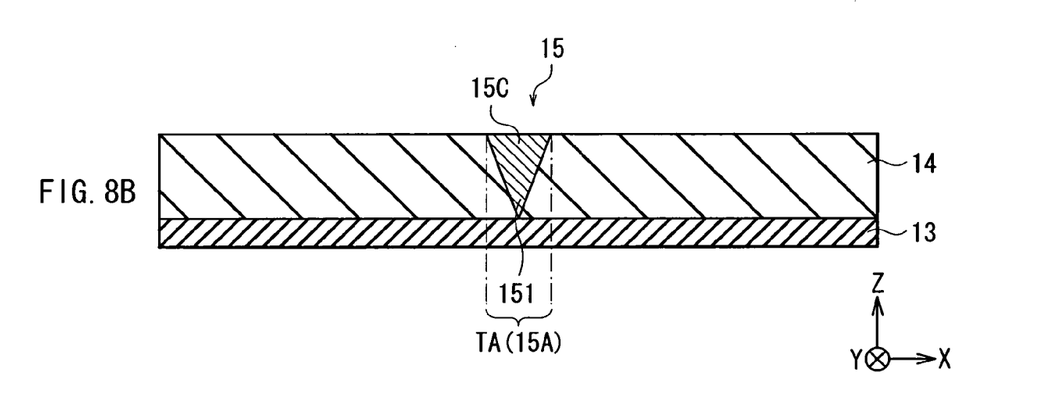
Figure 8C:
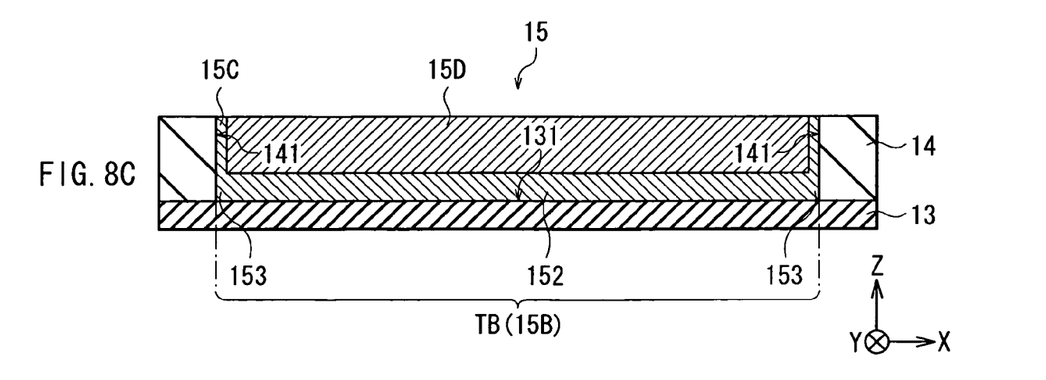

Finally, the outer frame portion 15C (magnetic pole tip portion relevance portion 151) and the embedded portion 15D are polished together with the insulating layer 14 to a desired thickness by using a CMP method etc. Thereby, the main magnetic pole layer 15 including the outer frame portion 15C and the embedded portion 15D is formed as illustrated in FIG. 8A, FIG. 8B, and FIG. 8C.

According to the thin film magnetic head of the present embodiment, the main magnetic pole layer 15 has a planar configuration including the magnetic pole tip portion 15A of a narrow width that defines the width of a write track, and the yoke portion 15B of a large width connected thereto. In this case, the main magnetic pole layer 15 includes the outer frame portion 15C (the magnetic pole tip portion 15A (magnetic pole tip portion relevance portion 151) and a part of the yoke portion 15B (the bottom face portion 152 and the side face portion 153)) formed with the vapor deposition method, and the embedded portion 15D (the remaining portion of the yoke portion 15B) formed with the plating method. Therefore, unintended erasure of information at the time of non-writing can be prevented while keeping the capability of writing for the following reasons.

According to the present embodiment, although the main magnetic pole layer 15 is formed by using both of the vapor deposition method and the plating method, the magnetic pole tip portion 15A which substantially generates a perpendicular magnetic field is formed with the vapor deposition method. In this case, since the saturation flux density of the magnetic pole tip portion 15A becomes high as compared with the case where it is formed with the plating method, intake capacity of the magnetic flux per unit volume increases. Accordingly, even if the width of trailing edge TE becomes narrow and the volume of the magnetic pole tip portion 15A decreases, the intake capacity of magnetic flux thereof is ensured.

Figure 9A:
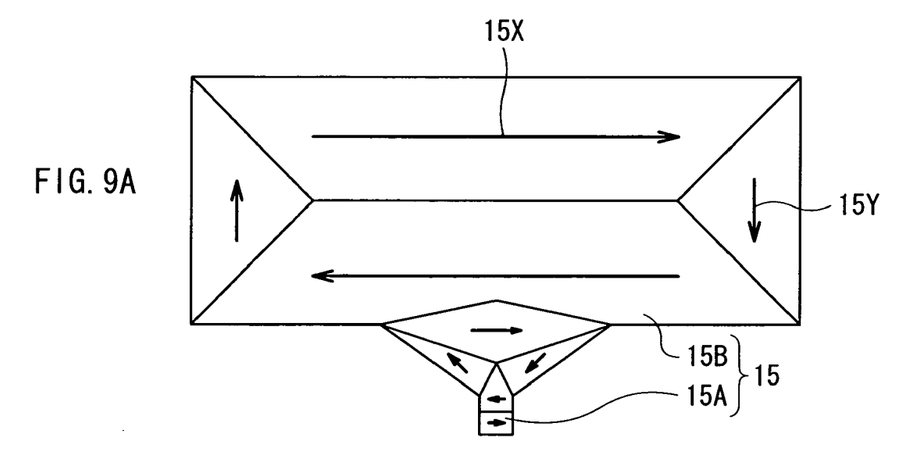
FIG. 9A and FIG. 9B are plan views for explaining a magnetic domain structure of the main magnetic pole layer.
Figure 9B:
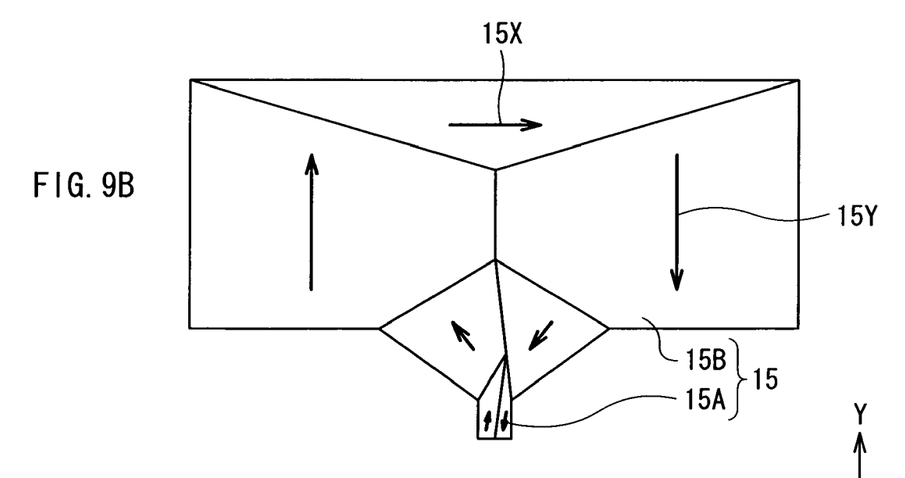

In addition, according to the embodiment, most part of the yoke portion 15B is formed with a plating method. In this case, it is more easy to normalize the magnetic domain structure of the yoke portion 15B so that a residual flux is less likely to leak out of the main magnetic pole layer 15 as compared with a case where it is formed with the vapor deposition method. The reason thereof can be explained in detail based on the difference in the magnetic domain structure as illustrated in FIG. 9A and FIG. 9B.

To cause the residual flux less likely to leak out of the main magnetic pole layer 15, it is necessary to direct an easy magnetization axis in a direction (X axial direction) perpendicular to an emitting direction of the magnetic flux (Y axial direction). In this respect, according to the embodiment, since the yoke portion 15B having a large width and a large area occupies a most part of the main magnetic pole layers 15, the likeliness of the leakage of the residual flux out of the main magnetic pole layer 15 substantially depends on the magnetic domain structure of the yoke portion 15B.

Here, since a magnetic film can be formed into a desired planar configuration when forming the magnetic film by the plating method, the easy magnetization axis can be directed to the X axial direction utilizing magnetic shape anisotropy. In this case, the easy magnetization axis can be set to the X axial direction because of the magnetic shape anisotropy, by growing the plating film with a photoresist pattern etc. as a frame to form the magnetic film into a horizontally-long planar configuration. In this case, further, if the plating film is grown up in a magnetic field, the easy magnetization axis can be directed to the X axial direction more easily.

On the other hand, since the magnetic film cannot be formed into a desired planar configuration when it is formed with the vapor deposition method, it is necessary to form the magnetic film entirely first and then to process it by etching or the like such that it becomes the desired planar configuration. Since the magnetic shape anisotropy cannot be utilized in this case, it is necessary, for directing the easy magnetization axis to the X axial direction, to conduct film formation in a magnetic field or to apply stress to the magnetic film so as to utilize distorted induced magnetic anisotropy.

Based on the above, according to the present embodiment, it becomes easy to direct the easy magnetization axis to the X axial direction by forming most part of the yoke portion B by the plating method. Thereby, since a longitudinally-divided magnetic domain is less likely to be formed as illustrated in FIG. 9A, it becomes less likely for residual flux to leak out of the main magnetic pole layer 15. On the other hand, if most part of the yoke portion 15B is formed with the vapor deposition method, it becomes difficult to direct the easy magnetization axis to the X axial direction. Thereby, since a longitudinally-divided magnetic domain is likely to be formed as illustrated in FIG. 9B, the residual flux is more likely to leak out of the main magnetic pole layer 15.

As described above, the main magnetic pole layer 15 is formed by utilizing both of the vapor deposition method and the plating method, and the whole part of the magnetic pole tip portion 15A is formed with the vapor deposition method while most part of the yoke portion 15B is formed with the plating method. Accordingly, since the saturation flux density of the magnetic pole tip portion 15A becomes high, the magnetic flux intake capacity of the magnetic pole tip portion 15A is ensured, and since the easy magnetization axis is more likely to be directed to the X axial direction in the magnetic domain structure of the yoke portion 15B, residual flux becomes less likely to leak out. In this case, in particular, if the easy magnetization axis in most part of the yoke portion 15B becomes likely to be directed to the X axial direction, the easy magnetization axis in the magnetic domain structure of the magnetic pole tip portion 15A also becomes more likely to be directed to the X axial direction. Thereby, the leakage of the residual flux is remarkably less likely to leak out. Namely, although the magnetic pole tip portion 15A is formed with the vapor deposition method by which the directional control of the easy magnetization axis is difficult, it becomes possible to direct the easy magnetization axis to the X axial direction also in the magnetic pole tip portion 15A having high saturation flux density by directing the easy magnetization axis to the X axial direction in most part of the yoke portion 15B as illustrated in FIG. 9A. Thereby, the residual flux hardly leaks out. Therefore, unintended erasure of information at the time of non-writing time can be suppressed while keeping the capability of writing.

In addition, in the method of manufacturing the thin film magnetic head according to the present embodiment, upon forming the main magnetic pole layer 15 in the opening portion 14K of the insulating layer 14, the outer frame portion 15C is formed in the regions TA and TB by utilizing the vapor deposition method, and thereafter, the embedded portion 15D is formed in the region TB by the plating method. In this case, since the whole of the magnetic pole tip portion 15A (magnetic pole tip portion relevance portion 151) and a part of the yoke portion 15B (the bottom face portion 152 and the side face portion 153) are formed at the same time in the depositing process by means of the vapor deposition method, only the remaining portion of the yoke 15B may be formed in the depositing process by the plating method as a post-production process. As a result, the formation process of the main magnetic pole layer 15 is simplified.

In addition, since the shape of the end face 15M of the magnetic pole tip portion 15A is an inverse triangle (triangle in which the width W1 of the trailing edge TE is larger than the width W2 of the leading edge LE), the capacity of the opening portion 14K (region TA) is smaller than that in the case where the shape of the end face 15M is rectangular with a uniform width W1. Accordingly, since the amount of the magnetic material necessary for filling in the region TA is decreased, the outer frame portion 15C (magnetic pole tip portion relevance portion 151) is formed in a short period of time. Moreover, since the amount of the magnetic material deposited on the region TB also decreases as the amount of the magnetic material deposited on the region TA decreases, the ratio of a portion in the yoke portion 15B formed with the plating method increases more. Thereby, the magnetic domain structure of the yoke portion 15B is more likely to become close to a proper state shown in FIG. 9A. Therefore, unintended erasure of information at the time of non-writing can be further suppressed.

In addition, since the width of the yoke portion 15B spreads gradually from the connecting position of the magnetic pole tip portion 15A and the yoke portion 15B, the inclined surface 15S is formed in the outer frame portion 15C in the vicinity of the above-mentioned connecting position as illustrated in FIG. 3A. In this case, since the thickness of the outer frame portion 15C having the high saturation flux density formed with the vapor deposition method becomes larger as approaching the magnetic pole tip portion 15A, the magnetic flux flowing in the main magnetic pole layer 15 while being squeezed from the yoke portion 15B of the large width toward the magnetic pole tip portion 15A of the narrow width is more likely to gather in the vicinity of the trailing edge TE, which is a substantial recording point. Therefore, the capability of writing can be more enhanced.

Figure 10:
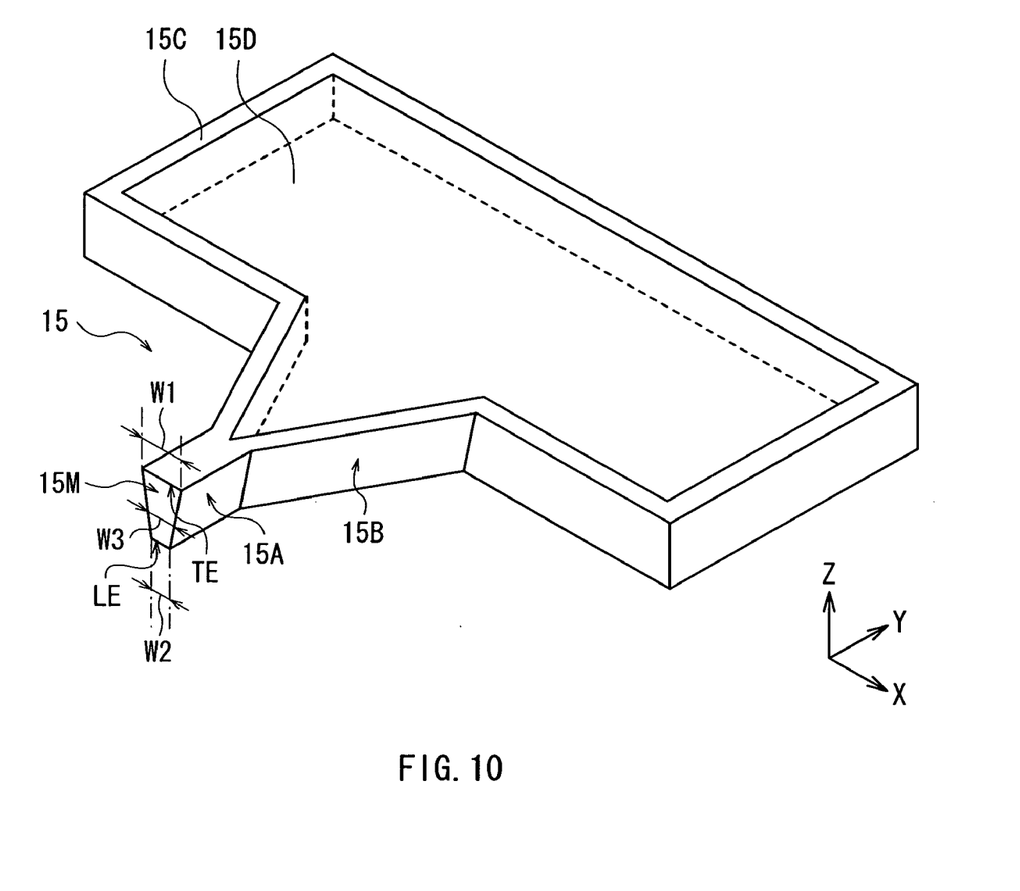
FIG. 10 is a perspective view showing a modification with regard to a configuration of the main magnetic pole layer.

By the way, the shape of the end face 15M of the magnetic pole tip portion 15A is not limited to inverse triangle but it may also be an inverted trapezoid (trapezoid in which the width W1 of the trailing edge TE is larger than the width W2 of the leading edge LE) as illustrated in FIG. 10. To form such main magnetic pole layer 15, an etching range and an amount to be etched may be modulated by changing the width of the opening portion 14K and so on, in the process of forming the opening portion 14K. Also in this case, unintended erasure of information at the time of non-writing can be suppressed while keeping the capability of writing.

Here, as for the configuration of the end face 15M, it is preferred that, when the widths W1, W2 and a width W3 of an arbitrary position between the trailing edge TE and the leading edge LE are compared, the width W1 be larger than the width W2 and the width W1 be equal to or larger than the width W3. Examples of such preferable configuration are the inverse triangle and the inverted trapezoid. That is because it can prevent an unintended writing in an adjacent track due to a skew at the time of the operation of the thin film magnetic head.

For this reason, any shape other than the inverse triangle and inverted trapezoid is also available as long as it satisfies the above-mentioned relationship among the widths W1 to W3. For the purpose of confirmation, when the shape of the end face 15M is a triangle (see FIG. 2), the width W2 is substantially zero, and the leading edge LE substantially serves as a vertex of angular portions.

However, the shape of the end face 15M is not necessarily limited to the inverse triangle, inverted trapezoid, etc., and may be a rectangle (a shape in which the width W1 of the trailing edge TE and the width W2 of the leading edge LE are equal to each other). Also in this case, unintended erasure of information at the time of non-writing can be suppressed while keeping the capability of writing.

As described above, although the present invention has been described with reference to the embodiment and example, the present invention is not limited to the above-described embodiment, and can be modified in various ways. For example, although the perpendicular magnetic write head of the present invention is applied to a combined head, it is not necessarily limited thereto, and may be applied to a write-only head which is not provided with the read head section. In addition, although the planar configuration of the yoke portion is horizontally-long, it may not be necessarily limited thereto and may be longitudinally-long.

What is claimed is:

1. A perpendicular magnetic write head comprising:
   a magnetic pole tip portion;
   a first yoke portion connected to the magnetic pole tip portion, having a width larger than that of the magnetic pole tip portion; and
   a second yoke portion, within the magnetic pole tip portion and the first yoke portion, only the first yoke portion having the recess portion in a center region thereof, and the second yoke portion being embedded in the recess portion, and
   the magnetic pole tip portion and the first yoke portion being integrally formed with a vapor deposition method, and the second yoke portion being formed with a plating method.

2. The perpendicular magnetic write head according to claim 1, wherein the magnetic pole tip portion has an end face on an air bearing surface, and a shape of the end face is a triangle or a trapezoid in which a width of a trailing edge is larger than a width of a leading edge.

3. The perpendicular magnetic write head according to claim 1, wherein the first yoke portion includes a portion spreading gradually in width from a connecting position of the magnetic pole tip portion and the first yoke portion.

* * * * *